United States Patent
Kim et al.

(10) Patent No.: US 7,703,379 B2
(45) Date of Patent: Apr. 27, 2010

(54) COFFEE MAKER AND MICROWAVE OVEN AND METHOD FOR CONTROLLING THE SAME

(75) Inventors: Dae Sik Kim, Changwon-si (KR); Man Su Park, Changwon-si (KR); Wan Je Cho, Masan-si (KR); Wang Lim Lee, Busan-si (KR); Jung Ju Kwon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1545 days.

(21) Appl. No.: 11/000,221

(22) Filed: Dec. 1, 2004

(65) Prior Publication Data
US 2005/0115413 A1 Jun. 2, 2005

(30) Foreign Application Priority Data
Dec. 2, 2003 (KR) .................. 10-2003-0086716
Dec. 2, 2003 (KR) .................. 10-2003-0086835

(51) Int. Cl.
 *A47J 31/00* (2006.01)
(52) U.S. Cl. .............. 99/281; 99/295; 99/300; 99/357; 219/78; 219/689
(58) Field of Classification Search .......... 99/327–333, 99/339, 340, 357, 279–323, 275, 391, DIG. 14, 99/451; 219/679, 678, 685, 680–682, 736, 219/739, 752–753, 756–758, 687, 688–689, 219/508, 494–501, 432–433; 392/441–443; D7/405, 406, 351, 402
See application file for complete search history.

(56) References Cited

U.S. PATENT DOCUMENTS

| 4,303,827 | A | | 12/1981 | Kyles |
| 4,325,293 | A | | 4/1982 | Bleckman |
| 5,283,854 | A | | 2/1994 | Schiebelhuth |
| 5,437,002 | A | | 7/1995 | Bennett |
| D479,431 | S | * | 9/2003 | Jung et al. .................. D7/351 |
| 6,737,620 | B2 | * | 5/2004 | Kim ........................... 219/679 |
| 7,186,960 | B2 | * | 3/2007 | Cho et al. .................. 219/689 |
| 7,202,452 | B2 | * | 4/2007 | Park et al. .................. 219/689 |
| D546,111 | S | * | 7/2007 | Kim ........................... D7/305 |
| 7,358,468 | B2 | * | 4/2008 | Kang .......................... 219/680 |
| 7,361,871 | B2 | * | 4/2008 | Cho et al. .................. 219/689 |

FOREIGN PATENT DOCUMENTS

| EP | 0 380 947 A1 | 8/1990 |
| EP | 1 343 356 A2 | 9/2003 |
| EP | 1 343 356 A2 | 9/2003 |

* cited by examiner

*Primary Examiner*—Timothy F. Simone
(74) *Attorney, Agent, or Firm*—Birch, Stewart, Kolasch & Birch, LLP

(57) ABSTRACT

A coffee maker and microwave oven includes: a room for mounting various electric parts on an inside thereof; a case at one side of the room; a water tank in an upper space of the case; a funnel under the water tank having a filter for extracting coffee; a water supply pipe having a first pipe connected to the water tank, and a second pipe for supplying water to the funnel directly; a water supply tube on a bottom of the case, having one end connected to the first pipe, and the other end connected to the second pipe; a heater tube in contact with the water supply tube, the heater tube having a heater for heating the water passing through the water supply tube; and a temperature sensing unit in the vicinity of the heater tube for measuring a temperature of the heater.

20 Claims, 6 Drawing Sheets

COFFEE MAKER AND MICROWAVE OVEN AND METHOD FOR CONTROLLING THE SAME

CROSS-REFERENCE TO RELATED APPLICATIONS

This application claims the benefit of Korean Application Nos. P2003-86716, and P2003-86835, both filed on Dec. 2, 2003, which are hereby incorporated by reference as if fully set forth herein.

BACKGROUND OF THE INVENTION

1. Field of the Invention

The present invention relates to coffee maker and microwave ovens, and more particularly, to a coffee maker and microwave oven and a method for controlling the same which can prevent electric components suffering from damage caused by overheating of a heater.

2. Discussion of the Related Art

In general, a microwave oven cooks food with intermolecular frictional heat generated as a high frequency wave (about 2,450 MHz) disturbs molecular arrangement of the food.

Because the microwave oven heats the food with the high frequency wave, the microwave oven cannot cook various kinds of food. For an example, coffee people enjoys to drink, cannot be prepared with the microwave oven, to require a coffee maker, separately.

However, presently, as a city grows the denser, leading to have a small residential space, and according to the trend of pursuing practicality, the various necessaries of life, starting from home appliances, are required to be compact, such that the home appliances are required to have, not only the traditional original functions, but also various extra functions.

However, the related art microwave oven can not meet such consumer demands.

SUMMARY OF THE INVENTION

Accordingly, the present invention is directed to a coffee maker and microwave oven and a method for controlling the same that substantially obviates one or more problems due to limitations and disadvantages of the related art.

An object of the present invention is to provide a coffee maker and microwave oven and a method for controlling the same which can prevent electric components from suffering damage caused by overheating of a heater.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a coffee maker and microwave oven includes an outfit room for mounting various electric parts on an inside thereof, a case at one side of the outfit room, a water tank in an upper space of the case, a funnel under the water tank having a filter for extracting coffee, a water supply pipe having a first pipe connected to the water tank, and a second pipe for supplying potable water to the funnel directly, a water supply tube on a bottom of the case, having one end connected to the first pipe, and the other end connected to the second pipe, a heater tube in contact with the water supply tube, the heater tube having a heater for heating potable water passing through the water tube, and a temperature sensing unit in the vicinity of the heater tube for measuring a temperature of the heater.

The coffee maker and microwave oven further includes a semicircular plate having the heater tube secured to an outside circumference thereof, and a securing recess at a center portion thereof.

The temperature sensing unit includes a temperature sensor placed in the securing recess, and a sensor coupler for securing the temperature sensor to the plate. The temperature sensor is a thermistor of which internal resistance varies with a temperature.

The sensor coupler includes a supporter joined with the temperature sensor, and one pair of hooks extended from opposite ends of the supporter, respectively.

The plate includes one pair of fastening holes on opposite sides of the securing recess for inserting the hook.

Preferably, the temperature senor and the sensor coupler are formed as one unit, and the heater tube is formed of ceramic.

In another aspect of the present invention, a heater assembly in a coffee maker and microwave oven includes a heater tube in contact with a water supply tube on a bottom of a case, a heater in the heater tube for heating potable water passing through the water supply tube, and a temperature sensing unit in the vicinity of the heater tube for measuring a temperature of the heater.

In another aspect of the present invention, a method for controlling a coffee maker and microwave oven includes the steps of a user putting a coffee maker unit into operation, supplying potable water from a water tank to a funnel through a water pipe and a water tube, and, at the same time with this, putting a heater in a heater tube in contact with the water tube into operation, to heat the potable water passing through the water tube, measuring a temperature of the heater periodically by using a temperature sensing unit in the vicinity of the heater tube, calculating a rate of temperature change of the heater according to the temperature measured, and cutting off power supply to the heater if the rate of the temperature change of the heater is higher than a preset value.

The rate of temperature change of the heater is calculated according to the following equation.

$$\Delta T = (T_n - T_{n-1})/(t_n - t_{n-1})$$

Where, $\Delta T$ denotes a rate of temperature change of the heater, $T_n$ denotes the heater temperature measured at a $t_n$ time, and $T_{n-1}$ denotes the heater temperature measured at a $t_{n-1}$ time.

The method further includes the step of calculating the rate of temperature change of the heater if the rate of temperature change of the heater is lower than a preset value.

The method further includes the step of expressing an error message if the rate of temperature change of the heater is higher than a preset value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
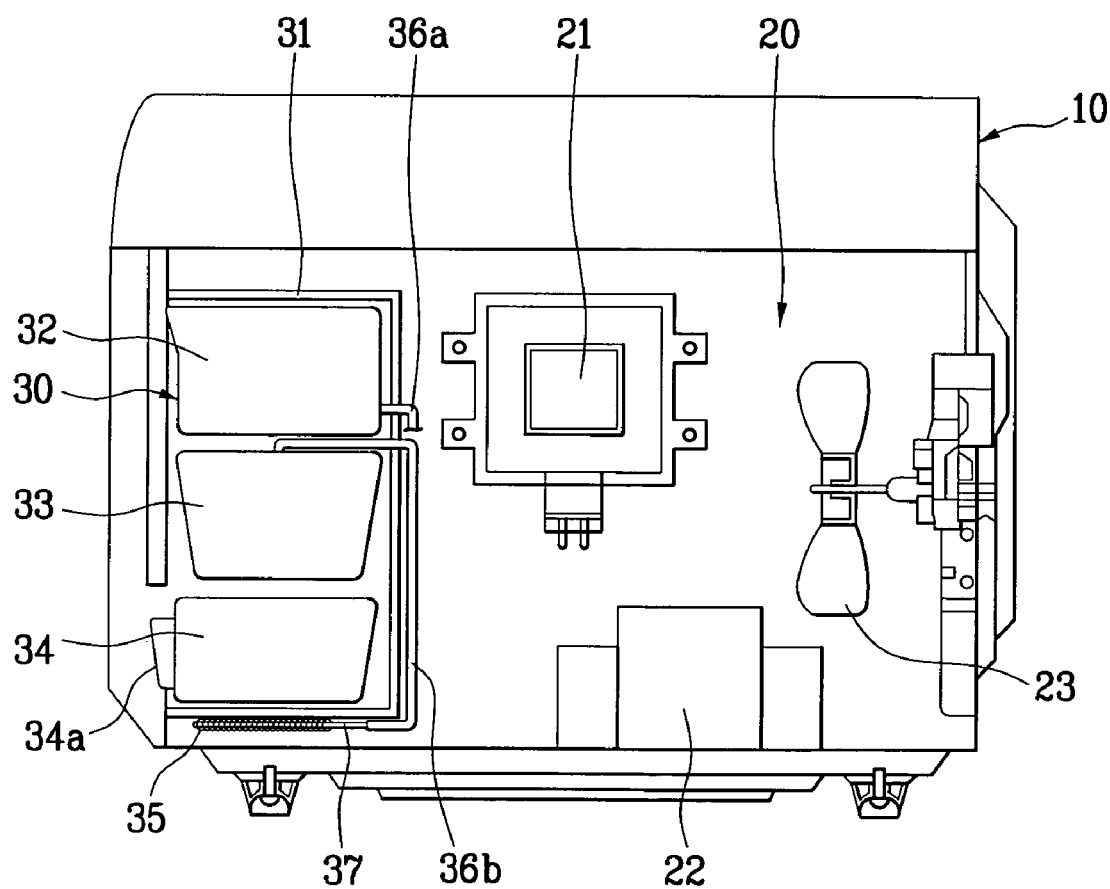
FIG. 1 illustrates a section of a coffee maker and microwave oven in accordance with a first preferred embodiment of the present invention.
Figure 2:
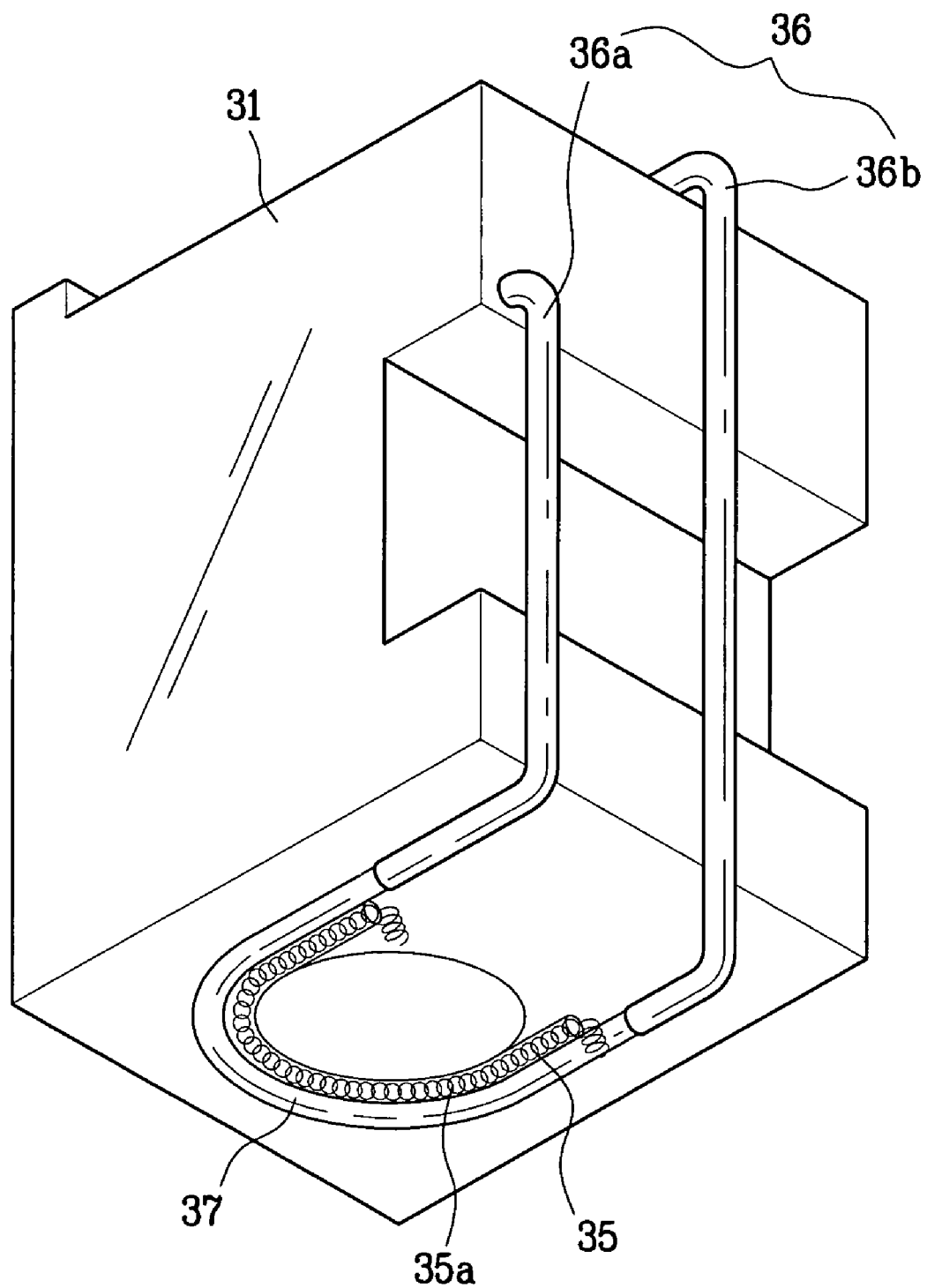
FIG. 2 illustrates a bottom perspective view of a coffee maker unit in FIG. 1.

FIG. 1 illustrates a section of a coffee maker and microwave oven in accordance with a first preferred embodiment of the present invention, and FIG. 2 illustrates a bottom perspective view of a coffee maker unit in the coffee maker and microwave oven in FIG. 1.

Referring to FIGS. 1 and 2, the coffee maker and microwave oven includes a cabinet 10 forming an exterior, an outfit room 20 in the cabinet 10, and a coffee maker unit 30 at one side of the outfit room 20.

In the outfit room 20, there are various electric parts, such as a magnetron 21, a high voltage transformer 22, and a convection fan 23. The magnetron 21 receives an external high voltage power, and generates a microwave, and the high voltage transformer 22 transforms external power to high voltage power, before application to the magnetron 21.

The convection fan 23 cools down various components in the outfit room 20, and blow hot air to a cooking chamber (not shown).

The coffee maker unit 30 includes a case 31 at one side of the outfit room 20, a water tank 32, a funnel 33, a water supply pipe 36, a water tube 37, and a heater tube 35.

The case 31 forms an exterior, and the water tank 32 at an upper portion of the case 21 for storing potable water. The funnel 33 under the water tank 32 has a filter (not shown) for extracting coffee.

In more detail, the funnel 33 has a shape of a cone having a great upper inside diameter, and a small lower inside diameter. On an inside of the funnel 33, there is a filter (not shown) of paper of non-woven fabric placed on an inside, on which coffee powder is filled.

Therefore, when a hot potable water is supplied to the funnel 33, the coffee powder is dissolved in the water, and coffee solution passes through the filter and drops downward. For this, under the funnel 34, there is a drop hole (not shown) in a bottom of the funnel 34 for enabling the coffee solution to drop downward.

In the meantime, under the funnel 33, there is a jug 34 as a container for storing coffee. The jug 34 has an opened top with a hand grip 34a at one side.

Accordingly, by gripping the hand grip 34a, the user can put the jug 34 inside of the case 31, or take the jug 34 out of the case 31, easily. In general, the jug 34 is formed of transparent glass or plastic for the user to see a level of the coffee in the jug 34.

The water supply pipe 36 supplies the potable water from the water tank 32 to the funnel 33. The water supply pipe 36 has a first pipe 36a connected to the water tank 32, and a second pipe 36b for supplying potable water to the funnel 33, directly.

The water supply tube 37 is mounted on a bottom of the case 31, and has one end connected to the first pipe 36a, and the other end connected to the second pipe 36b. Therefore, the potable water in the water tank 32 is supplied to the funnel 33 through the first pipe 36a, the water supply tube 37, and the second pipe 36b.

The heater tube 35 is in contact with the water supply tube 37, and has a heater 35a provided therein. Upon putting the coffee maker unit 30 into operation, the heater 35a generates heat at a high temperature, to heat the potable water passing through the water supply tube 37.

According to this, the potable water guided to the water supply tube 37 through the first pipe 36a is heated by the heater 35a and supplied to the funnel 33 via the second pipe 36b.

It is preferable that the heater tube 35 is formed of a material having a good heat conductivity for smooth conduction of heat from the heater 35a. In detail, it is preferable that the heater tube 35 is formed of ceramic.

Moreover, the heater 35a also heats the jug 34 placed on the bottom of the case 31. Therefore, the coffee in the jug 34 always maintains a warm state by the heat from the heater 35a.

However, if the user puts the coffee maker unit 30 into operation, failing to know that, for an example, there is no water in the water tank 32 by mistake, the coffee maker and microwave oven is involved in damage to the electric components caused by overheating of the heater 35a.

That is, if the heater 35a is put into operation in a state no potable water is supplied to the tube 37, the heater 35a is overheated. In this instance, owing to a high temperature of the heater 35, not only an inside temperature of the coffee maker unit 30, but also an inside temperature of the outfit room 20 rise high to damage electric parts, such as the magnetron 21, the high voltage transformer 22, and so on.

In order to prevent this, the coffee maker and microwave oven of the present invention is provided with separate temperature measuring means for preventing the heater 35a from overheating.

Figure 3:
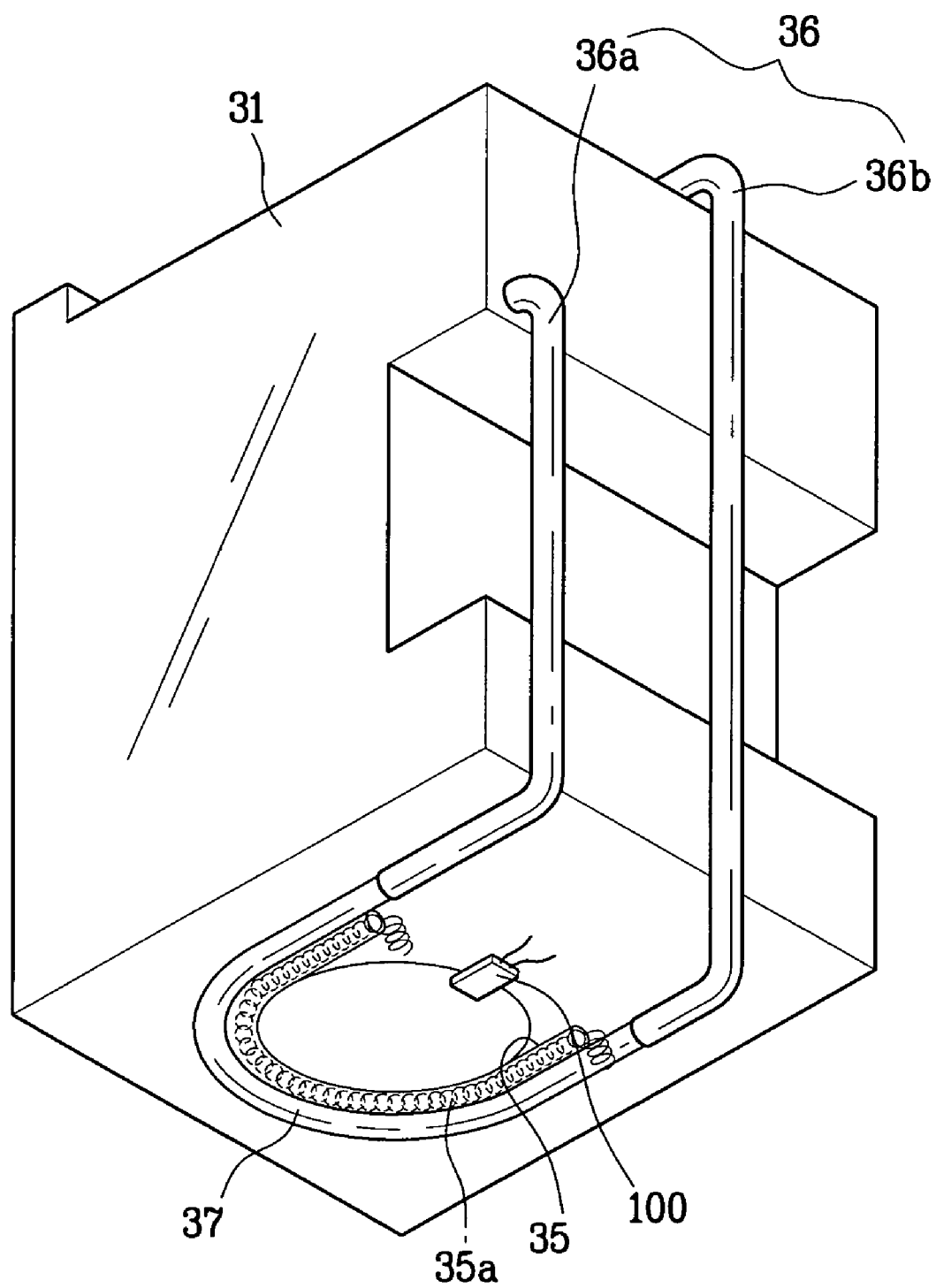
FIG. 3 illustrates a perspective view of a coffee maker and microwave oven in accordance with a second preferred embodiment of the present invention.

FIG. 3 illustrates a perspective view of a coffee maker and microwave oven in accordance with a second preferred embodiment of the present invention.

Referring to FIG. 3, the coffee maker and microwave oven includes a sensing unit 100 provided in the vicinity of the heater tube 37, for measuring a temperature of the heater 35a. In detail, the temperature sensing unit 100 is fastened to the bottom of the case 31 at a location spaced a distance from the heater tube 37.

The temperature sensing unit 100 measures a temperature of the heater 35a, to sense rapid temperature rise of the heater 35, i.e., overheating of the heater 35a, caused by shortage of the potable water in advance.

In more detail, the temperature sensing unit 100 measures the temperature of the heater 35a periodically, and transmits a temperature value of the heater 35a to the control unit (not shown) which controls operation of the coffee maker unit 30.

Then, the control unit reads the temperature value of the heater 35a from the temperature sensing unit 100, and cuts off power supply to the heater 35a, if it is determined that the temperature of the heater 35a rises rapidly. According to this, overheating of the heater 35a is prevented, to prevent the electric parts suffering from damage caused by overheating of the heater 35a.

Meanwhile, though not shown, the temperature sensing unit 100 may be mounted, not in the vicinity of the heater tube, but on an outside surface of the heater tube 37. In this case, the temperature sensing unit 100 can measure the temperature of the heater 35a more accurately.

However, in this case, it is difficult to mount the temperature sensing unit on the outside of the heater tube 37, and the control unit is liable to mistake in determining overheating of the heater, to cut off the power to the heater 35a unnecessarily.

In more detail, if the temperature sensing unit 100 is provided to be in contact with the heater 35a nearly, the temperature sensing unit 100 can measure a temperature change of the heater 35a without delay.

However, the temperature of the heater 35a drops or rises very rapidly at the time of putting the heater 35 into operation, or stopping operation of the heater 35a, when if the temperature sensing unit 100 measure the rapid temperature change of the heater 35a, and transmits to the control unit without delay, the control unit cuts off power to the heater 35a to stop operation of the coffee maker unit unnecessarily, even if the heater 35a is not overheated.

Accordingly, it is preferable that the temperature sensing unit 100 is spaced a distance away from the heater tube 37.

Figure 4:
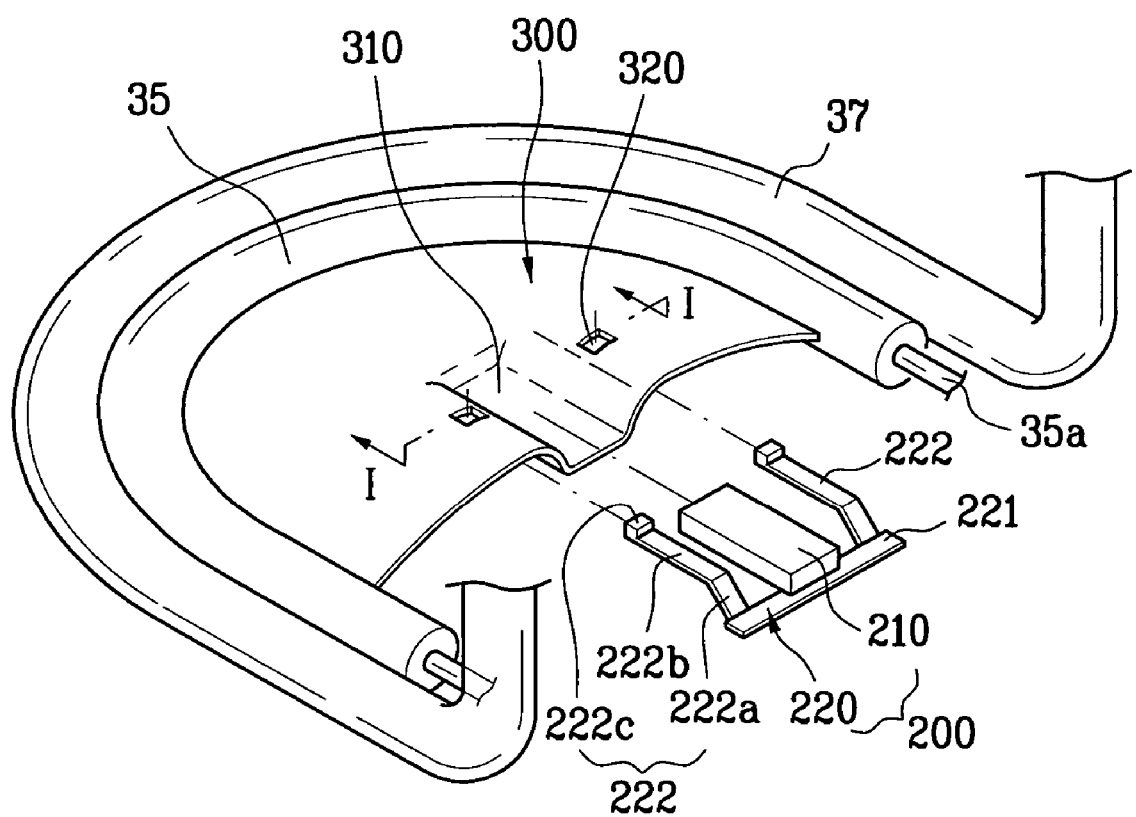
FIG. 4 illustrates a perspective view of a coffee maker and microwave oven in accordance with a third preferred embodiment of the present invention.

FIG. 4 illustrates a perspective view of a coffee maker and microwave oven in accordance with a third preferred embodiment of the present invention.

Referring to FIG. 4, the coffee maker and microwave oven includes a water supply tube 37 on a bottom of the case 31 (see FIG. 2), and a heater assembly.

The heater assembly includes a heater tube 35, a heater in the heater tube 35, and a temperature sensing unit 200.

The heater tube 35 is in contact with the water supply tube 37, for the heater 35a to heat the potable water passing through the water supply tube 37. The temperature sensing unit 200 is mounted in the vicinity of the heater tube 35, for measuring a temperature of the heater 35a.

In the meantime, the heater assembly further includes a plate 300 for mounting the temperature sensing unit 200 thereon. The plate 300 is semicircular, and mounted on an inner side of the heater tube 35.

Accordingly, the heater tube 35 is secured to an outside circumferential surface of the plate 300, and the water supply tube 37 is positioned on an outer side of the heater tube 35.

The plate 300 has a securing recess 310 for inserting the temperature sensing unit 200. The securing recess 310 is recessed to form a space for inserting the temperature sensing unit 200 therein.

According to this, the temperature sensing unit 200 is inserted in the securing recess 310 of the plate 300, for measuring the temperature of the heater 35a in a state the temperature sensing unit 200 is in close contact with the plate 300.

The temperature sensing unit 200 measures the temperature of the heater 35a, not directly, but indirectly through heat of the heater 35a transmitted through the plate 300. Therefore, it is preferable that the plate 300 is formed of a material having a good heat conductivity. However, taking production cost into account, the plate 300 may be formed of a general metal.

In the meantime, the temperature sensing unit 200 includes a temperature sensor 210 for measuring the temperature of the heater 35a, and a sensor coupler 220 for securing the temperature sensor 210 to the plate 300.

It is preferable that the temperature senor 210 is a thermistor of which internal resistance varies with a temperature, and the temperature sensor 210 and the sensor coupler 220 are formed as a unit.

The sensor coupler 220 includes a supporter 221 joined with the temperature sensor 210, and one pair of hooks 222 extended from opposite ends, respectively. On opposite sides of the securing recess 310 of the plate 300, there are one pair of fastening holes 320 for inserting the one pair of hooks 222 therein.

The hook 222 includes a first extension 222a extended upward from the supporter 221 at an angle, a second extension 222b extended from the first extension 222a in a horizontal direction, and a projection 222c at an end of the second extension 222b for insertion in the fastening hole 320.

Figure 5:
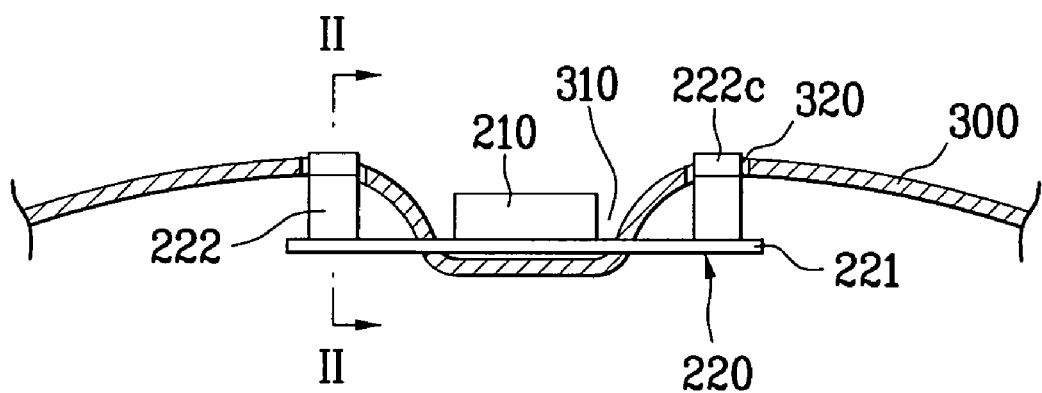
FIGS. 5 and 6 illustrate sections each showing a state a temperature sensing unit in accordance with a third preferred embodiment of the present invention is mounted on a plate.
Figure 6:
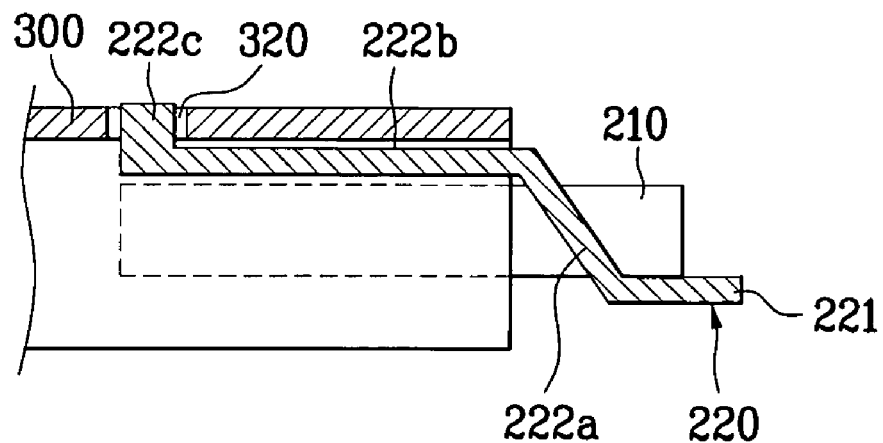

A process for mounting the temperature sensing unit 200 on the plate 300 will be described. FIGS. 5 and 6 illustrate sections each showing a state a temperature sensing unit in accordance with a third preferred embodiment of the present invention is mounted on a plate.

Referring to FIGS. 5 and 6, upon mounting the sensor coupler 220 to the plate 300, the temperature sensor 210 is placed in the securing recess 310 on an upper surface of the plate 300, and the hooks 222 exert force from an underside of the plate to upward, such that the projection 222c is inserted in the fastening hole 320.

According to this, the temperature sensing unit 200 can be secured to the plate 300. Of course, if above steps are reversed, the temperature sensing unit 200 can be dismounted from the plate 300, easily.

A method for controlling a coffee maker and microwave oven in accordance with a present invention will be described in detail, in which an heater 35a is prevented from overheating by using the temperature sensing unit 100, or 200.

Figure 7:
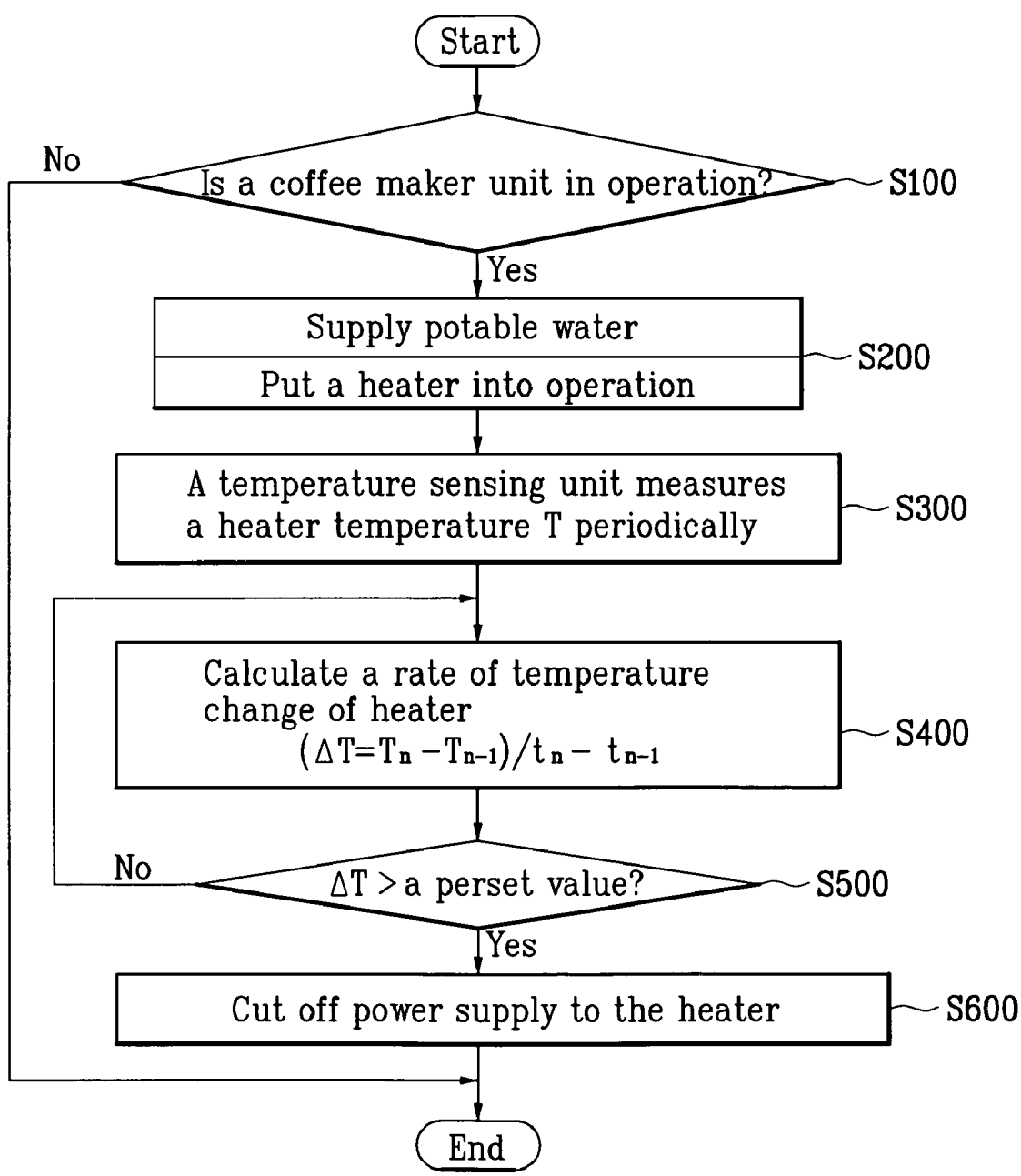
FIG. 7 illustrates a flow chart showing the steps of a method for controlling a coffee maker and microwave oven in accordance with a preferred embodiment of the present invention.

FIG. 7 illustrates a flow chart showing the steps of a method for controlling a coffee maker and microwave oven in accordance with a preferred embodiment of the present invention.

Referring to FIG. 7, for extracting coffee, the user put the coffee maker unit into operation (S100).

When the coffee maker unit 30 is started, the control unit supplies potable water from the water tank 32 to the funnel 33 through the water supply pipes 36a, and 36b, and the water supply tube 37, and puts the heater 35a in the heater tube 35 in contact with the water supply tube 37 into operation, to heat the potable water passing through the water supply tube 37 (S200).

In this instance, the temperature sensing unit 200 in the vicinity of the heater tube 35 measures a temperature T of the heater 35a, periodically (S300). The temperature T of the heater 35a measured at the temperature sensing unit 200 is transmitted to the control unit.

Then, upon reception of the temperature T of the heater 35a from the temperature sensing unit 200, the control unit calculates a rate of temperature change of the heater 35a (S400), according to the following equation.

$$\Delta T = (T_n - T_{n-1})/(t_n - t_{n-1})$$

Where, ΔT denotes a rate of temperature change of the heater, $T_n$ denotes the heater temperature measured at a $t_n$ time, and $T_{n-1}$ denotes the heater temperature measured at a $t_{n-1}$ time.

The rate ΔT of the temperature change of the heater 35*a* is determined of being higher than a preset value (S500).

As a result of the determination (S500), if the rate ΔT of the temperature change of the heater 35*a* is higher than the preset value, power supply to the heater 35*a* is cut off (S600). That is, if the rate ΔT of the temperature change of the heater 35*a* is rapid, determining that the heater 35*a* is overheating due to shortage of potable water in the water tank 32, operation of the heater 35*a* is stopped.

In this instance, it is preferable that an error message is expressed if the rate of temperature change of the heater 35*a* is higher than the preset value, so that the user is able to know the overheating of the heater 35*a*, immediately.

There may be a variety of methods of the expression, such as displaying a character message directly on a display panel provided on a front surface of the coffee maker unit, or sounding an alarm.

If the rate ΔT of the temperature change of the heater 35*a* is lower than the preset value, the steps of calculating the rate ΔT of the temperature change of the heater 35*a* is repeated, to determine if the rate ΔT of the temperature change of the heater 35*a* is higher than the preset value.

As has been described, the coffee maker and microwave oven and the method for controlling the same of the present invention have the following advantages.

First, the provision of the temperature sensing unit for measuring a temperature of the heater permits the user to know overheating of the heater quickly, thereby preventing electric components suffering from damage.

Second, the expression of an error message when the heater is overheated due to shortage of potable water, enabling the user to supply the potable water or take other required measure quickly, improves reliability of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A coffee maker and microwave oven comprising:
   a room for mounting various electric parts on an inside thereof;
   a case at one side of the room;
   a water tank in an upper space of the case;
   a funnel under the water tank having a filter for extracting coffee;
   a water supply pipe having a first pipe connected to the water tank, and a second pipe for supplying water to the funnel directly;
   a water supply tube on a bottom of the case, having one end connected to the first pipe, and the other end connected to the second pipe;
   a heater tube in contact with the water supply tube, the heater tube having a heater for heating the water passing through the water supply tube;
   a temperature sensing unit in the vicinity of the heater tube for measuring a temperature of the heater; and
   a plate having the heater tube secured to an outside circumference thereof, and a securing recess at a center portion thereof.

2. The coffee maker and microwave oven as claimed in claim 1, wherein the plate has a semicircular shape.

3. The coffee maker and microwave oven as claimed in claim 2, wherein the temperature sensing unit includes;
   a temperature sensor placed in the securing recess, and
   a sensor coupler for securing the temperature sensor to the plate.

4. The coffee maker and microwave oven as claimed in claim 3, wherein the temperature sensor is a thermistor of which internal resistance varies with a temperature.

5. The coffee maker and microwave oven as claimed in claim 3, wherein the sensor coupler includes;
   a supporter joined with the temperature sensor, and
   one pair of hooks extended from opposite ends of the supporter, respectively.

6. The coffee maker and microwave oven as claimed in claim 5, wherein the plate includes one pair of fastening holes on opposite sides of the securing recess for inserting the hook.

7. The coffee maker and microwave oven as claimed in claim 3, wherein the temperature senor and the sensor coupler are formed as one unit.

8. The coffee maker and microwave oven as claimed in claim 1, wherein the heater tube is formed of ceramic.

9. A heater assembly in a coffee maker and microwave oven comprising:
   a heater tube in contact with a water supply tube on a bottom of a case;
   a heater in the heater tube for heating water passing through the water supply tube;
   a temperature sensing unit in the vicinity of the heater tube for measuring a temperature of the heater; and
   a plate having the heater tube secured to an outside circumference thereof, and a securing recess at a center portion thereof.

10. The heater assembly as claimed in claim 9, wherein the plate has a semicircular shape.

11. The coffee maker and microwave oven as claimed in claim 10, wherein the temperature sensing unit includes;
    a temperature sensor, and
    a sensor coupler joined with the temperature sensor, and secured to the securing recess in the plate.

12. The heater assembly as claimed in claim 11, wherein the temperature sensor is a thermistor of which internal resistance varies with a temperature.

13. The heater assembly as claimed in claim 11, wherein the sensor coupler includes;
    a supporter having the temperature sensor mounted thereon, and
    one pair of hooks respectively extended from opposite ends of the supporter, for coupling with the plate.

14. The heater assembly as claimed in claim 13, wherein the plate includes one pair of fastening holes on opposite sides of the securing recess for inserting the hook.

15. The heater assembly as claimed in claim 11, wherein the temperature senor and the sensor coupler are formed as one unit.

16. The heater assembly as claimed in claim 9, wherein the heater tube is formed of ceramic.

17. A method for controlling a coffee maker and microwave oven comprising the steps of:
    a user putting a coffee maker unit into operation;
    supplying water from a water tank to a funnel through a water pipe and a water tube, and, at the same time with this, putting a heater in a heater tube in contact with the water tube into operation, to heat the water passing through the water tube;

measuring a temperature of the heater periodically by using a temperature sensing unit secured on a plate having the heater tube secured to an outside circumference thereof;

calculating a rate of temperature change of the heater according to the temperature measured; and cutting off power supply to the heater if the rate of the temperature change of the heater is higher than a preset value.

18. The method as claimed in claim 17, wherein the rate of temperature change of the heater is calculated according to the following equation $$\Delta T = (T_n - T_{n-1})/(t_n - t_{n-1})$$

Where, $\Delta T$ denotes a rate of temperature change of the heater, $T_n$ denotes the heater temperature measured at a $t_n$ time, and $T_{n-1}$ denotes the heater temperature measured at a $t_{n-1}$ time.

19. The method as claimed in claim 17, further comprising the step of calculating the rate of temperature change of the heater if the rate of temperature change of the heater is lower than a preset value.

20. The method as claimed in claim 17, further comprising the step of expressing an error message if the rate of temperature change of the heater is higher than a preset value.

* * * * *